(12) United States Patent
Beck et al.

(10) Patent No.: US 10,395,549 B2
(45) Date of Patent: Aug. 27, 2019

(54) SIMULATION PLATFORM MODULE

(71) Applicant: Lockheed Martin Corporation, Bethesda, MD (US)

(72) Inventors: Timothy B. Beck, Seattle, WA (US); Christopher H. Meyer, Orlando, FL (US); Darren H. Goldfarb, Orlando, FL (US); Wesley L. Bard, Winter Springs, FL (US); Michael J. Schroeter, Issaquah, WA (US)

(73) Assignee: Lockheed Martin Corporation, Bethesda, MD (US)

( * ) Notice: Subject to any disclaimer, the term of this patent is extended or adjusted under 35 U.S.C. 154(b) by 1257 days.

(21) Appl. No.: 14/103,516

(22) Filed: Dec. 11, 2013

(65) Prior Publication Data

US 2015/0161904 A1  Jun. 11, 2015

(51) Int. Cl.
*G09B 9/02* (2006.01)

(52) U.S. Cl.
CPC ...................... *G09B 9/02* (2013.01)

(58) Field of Classification Search
CPC ............. G09B 9/00; G09B 9/02; G09B 9/003
See application file for complete search history.

(56) References Cited

U.S. PATENT DOCUMENTS

| | | | | |
|---|---|---|---|---|
| 2002/0150866 A1* | 10/2002 | Perry | ...................... | F41G 7/006 434/62 |
| 2009/0215011 A1* | 8/2009 | Christensen | ........... | G09B 23/28 434/29 |
| 2009/0298024 A1* | 12/2009 | Batzler | ................... | B23K 9/32 434/234 |
| 2012/0088209 A1* | 4/2012 | Poole | ...................... | G09B 9/003 434/11 |

FOREIGN PATENT DOCUMENTS

| | | |
|---|---|---|
| WO | 2007109507 A2 | 9/2007 |
| WO | 2012158432 A2 | 11/2012 |

OTHER PUBLICATIONS

Summons to Attend Oral Proceedings for European Patent Application No. 14197123.4, dated Feb. 7, 2018, 7 pages.
Examination Report for European Patent Application No. 14197123.4, dated Jul. 3, 2017, 4 pages.
Extended European Search Report for European Patent Application No. 14197123.4-1958, dated May 7, 2015, 7 pages.

* cited by examiner

*Primary Examiner* — Timothy A Musselman
(74) *Attorney, Agent, or Firm* — Withrow & Terranova, PLLC

(57) ABSTRACT

A simulation platform module. The simulation platform module determines that an external simulation object exists. The simulation platform module initiates the external simulation object into an executing state, and receives from the external simulation object an event mapping. The event mapping maps an input to an event implemented by the external simulation object in response to notification of the occurrence of the input, and an object attribute identifier that identifies an object attribute controlled by the external simulation object. The simulation platform module receives a user input from a user, and determines that the user input matches the input. The external simulation object is notified of the occurrence of the input, an input identifier that identifies the input is stored in a data structure.

24 Claims, 9 Drawing Sheets

SIMULATION PLATFORM MODULE

TECHNICAL FIELD

The present embodiments relate to simulation platforms, and in particular to a simulation platform that facilitates the integration of external objects into the simulation platform.

BACKGROUND

Simulation platforms are frequently quite complex, and consequently are typically manufactured by an entity skilled in simulation technology. Commercial entities typically purchase or license such a simulation platform for use in training employees, or for use in offering training to other entities. Simulation platforms typically come packaged with one or more objects which may be used in a simulation, such as a ground vehicle, an airplane, a helicopter, or the like.

Often a user of a simulation platform may desire that the simulation platform allow for the simulation of an object that is not provided by the simulation platform manufacturer. For example, a trucking company may desire that the simulation platform simulate a dashboard of a new model of truck to facilitate training of employees on the new truck model. Simulation platform manufacturers often do not provide customers with source code, and thus the user, even if capable of modifying complex simulation technology, cannot modify the simulation platform to simulate the dashboard of the new truck model. Moreover, the simulation platform manufacturer may not be willing to upgrade their simulation platform to simulate the new dashboard, or may not be able to modify their simulation platform in a timely manner.

Some simulation platforms offer a training mode that facilitates training of a user. During the training mode, the simulation platform may load a previously created mission file that identifies desired actions in a training mission. The mission file contains both desired actions by a user, as well as exception handlers that provide error messages, hints, tips, or the like, when the user fails to act in the desired manner. For example, a mission file for a simulation involving an airplane may indicate that a user is to take off from a runway and rise to an altitude of 5000 feet within 20 seconds of leaving the runway. Failure to reach 5000 feet in altitude within 20 seconds causes an exception handler to be invoked that alerts the user to the failure in some desired manner. The generation of a mission file is relatively labor intensive, and generally requires manually programming each exception handler for each step in the mission file.

Accordingly, there is a need for a flexible simulation platform that facilitates the integration of external objects created by purchasers or users of a simulation platform into the simulation platform, that automates the generation of a mission file to eliminate or greatly reduce the effort involved in generating a mission file, and that facilitates the integration of external objects into a mission file.

SUMMARY

The present embodiments relate to a simulation platform module. Among other features, the embodiments allow the relatively seamless integration of external simulation objects with native simulation objects that form a part of the simulation platform module. Such integration allows, for example, an entity, such as a company, that has licensed or purchased the simulation platform module from a manufacturer, but who may not have an ability to modify the simulation platform module, to manufacture external simulation objects that have an independent codebase from that of the simulation platform module, but which interoperate with the simulation platform module in a manner substantially similar to a native simulation object.

The embodiments also facilitate the integration of external simulation objects into a mission creation mode of the simulation platform module, wherein a mission may be created that involves native simulation objects as well as one or more external simulation objects. The embodiments also facilitate the generation of a mission file that identifies a simulation sequence based on information recorded during the mission creation mode and that may be used to train users during a mission training mode. The mission file includes one or more exception handler modules that are automatically generated by the simulation platform module based on the information recorded during the mission creation mode. The exception handler modules are configured to be triggered upon an occurrence of a deviating user action, such that the user is alerted to a deviation from the simulation sequence.

In one embodiment, a method for generating a mission file is provided. A simulation platform module determines that an external simulation object exists. The simulation platform module initiates the external simulation object into an executing state. The simulation platform module receives, from the external simulation object, a first event mapping that maps a first input to a first event implemented by the external simulation object in response to notification of the occurrence of the first input, and an object attribute identifier that identifies an object attribute controlled by the external simulation object. A first user input is received from a user. The simulation platform module determines that the first user input matches the first input. The external simulation object is notified of the occurrence of the first input, and a first input identifier that identifies the first input is stored in a data structure. This process may be repeated continually during the creation of a mission during a mission creation mode. The process may also involve any number of external simulation objects that have a codebase separate from that of the simulation platform module, and that are discovered during an initialization stage of the simulation platform module, as well as any number of native simulation objects that share the same codebase as the simulation platform module.

After the mission has been created, the simulation platform module may, based on the data structure, generate a mission file that identifies a simulation sequence based on a plurality of different input identifiers stored in the data structure, the times the inputs that correspond to the input identifiers were received, and attribute values of object attributes. The simulation platform module also automatically determines at least one deviating user action based on the simulation sequence. The simulation platform module generates an exception handler module that is configured to be triggered upon an occurrence of the deviating user action. The exception handler module is configured to alert the user to a deviation from the simulation sequence.

During a subsequent mission training mode, the simulation platform module loads the mission file. The simulation platform module receives a plurality of inputs from a user over a period of time. Based on the simulation sequence identified in the mission file and a user action, the simulation platform module makes a determination that the deviating user action has occurred, and, in response to the determination, invokes the handler function.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The embodiments relate generally to a simulation platform module. Among other features, the embodiments allow the relatively seamless integration of external simulation objects with native simulation objects that form a part of the simulation platform module. Such integration allows, for example, an entity, such as a company, that has licensed or purchased the simulation platform module from a manufacturer, but who may not have an ability to modify the simulation platform module, to manufacture external simulation objects that have a completely independent codebase from that of the simulation platform module, but which interoperate with the simulation platform module in a manner substantially similar to a native simulation object.

The embodiments also facilitate the integration of external simulation objects into a mission creation mode of the simulation platform module, wherein a mission may be created that involves native simulation objects as well as one or more external simulation objects. The embodiments also facilitate the generation of a mission file that identifies a simulation sequence based on information recorded during the mission creation mode, which may be used to train users during a mission training mode. The mission file includes one or more exception handler modules, which are automatically generated by the simulation platform module based on the information recorded during the mission creation mode. The exception handler modules are configured to be triggered upon an occurrence of a deviating user action, such that the user is alerted to a deviation from the simulation sequence.

Any flowcharts discussed herein are necessarily discussed in some sequence for purposes of illustration, but unless otherwise explicitly indicated, the embodiments are not limited to any particular sequence of steps.

The use herein of ordinals in conjunction with an element is solely for distinguishing what might otherwise be similar or identical labels, such as "first format" and "second format," and does not imply a priority, a type, an importance, or other attribute, unless otherwise stated herein.

Figure 1:
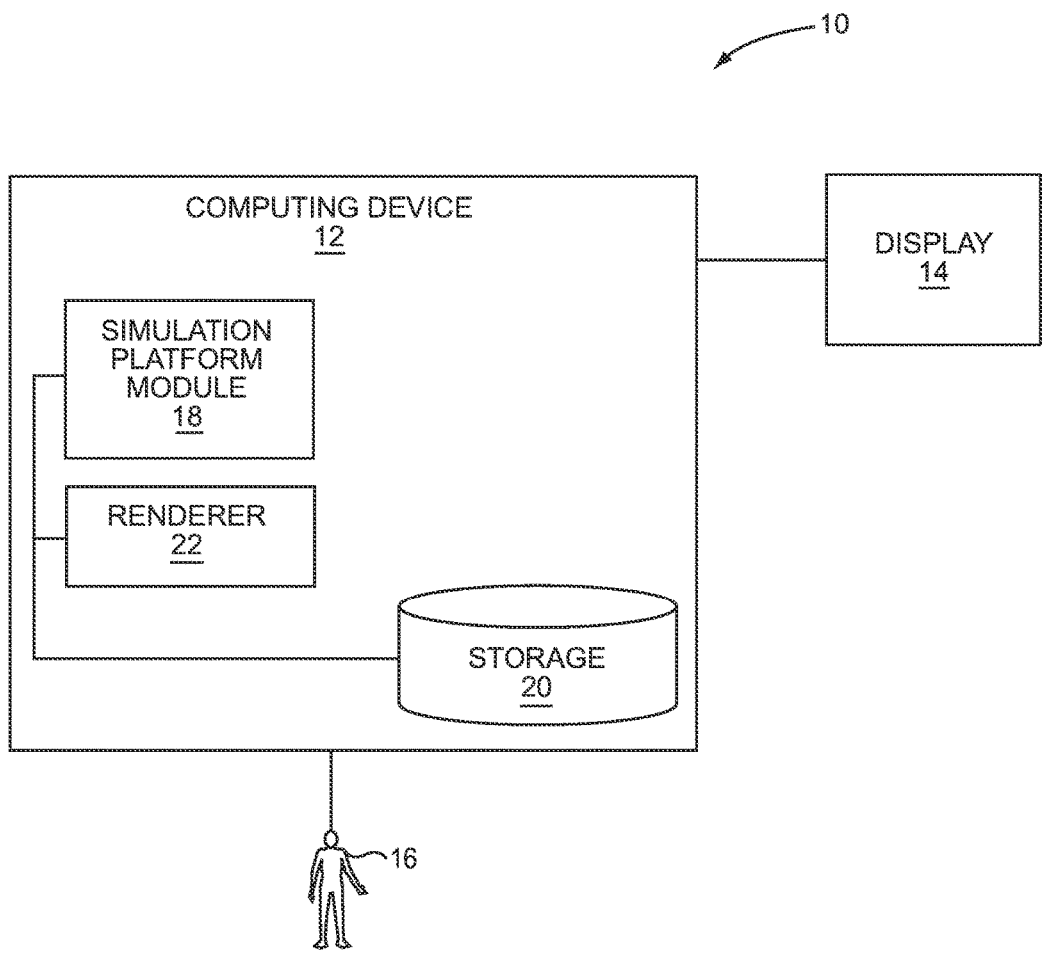
FIG. 1 is a functional block diagram of a system in which embodiments may be practiced.

FIG. 1 is a functional block diagram of a system 10 in which embodiments may be practiced. The system 10 includes a computing device 12 coupled to a display 14. A user 16 interacts with the computing device 12 to initiate a simulation platform module 18. The simulation platform module 18 may comprise complex software instructions, firmware or other electronic circuitry, or a combination of both. In some embodiments, the computing device 12 may be a general purpose computer, such as a laptop, desktop or workstation computer, which includes a storage 20 on which the simulation platform module 18 may reside. Upon request by the user 16, the computing device 12 may initiate the simulation platform module 18, such that the simulation platform module 18 becomes operable to interact with the user 16. In other embodiments, the computing device 12 may be a relatively special purpose simulation device, such that the computing device 12, by default, when powered on, initiates the simulation platform module 18.

The computing device 12 may also include a renderer 22 configured to generate imagery, including video imagery, for presentation on the display 14. The renderer 22 may comprise, for example, one or more graphic processing units (CPUs), such as GPUs manufactured by NVIDIA Corporation, Advanced Micro Devices, or the like, and related software instructions, such as device drivers and graphic application programming interfaces (APIs), such as OpenGL® or DirectX®.

While for purposes of illustration functionality discussed herein may be attributed to the simulation platform module 18, the particular division of functionality within the computing device 12 may be design dependent, and thus, depending on the particular implementation, certain functionality described herein may be implemented in any number of different modules, or components, of the computing device 12. Accordingly, functionality may be attributed herein generally to the computing device 12, or specifically to the simulation platform module 18, but any such attribution is not intended to limit any particular implementation of the embodiments to any particular design.

As will be discussed in greater detail herein, the simulation platform module 18 works in conjunction with simulation objects. Certain simulation objects, referred to herein as native simulation objects, are part of the codebase of the simulation platform module 18. In other words, the native simulation objects are manufactured by the manufacturer of the simulation platform module 18, and a licensor or purchaser of the simulation platform module 18 receives the functionality of the native simulation objects by virtue of licensing or purchasing the simulation platform module 18. In one embodiment, the simulation platform module 18 also enables externally developed simulation objects, referred to herein as external simulation objects, to be integrated into the operation of the simulation platform module 18, so long as the external simulation objects are manufactured in conjunction with a certain protocol, or interface, that facilitates communication between the simulation platform module 18 and the external simulation objects. Collectively, native simulation objects and external simulation objects may be referred to herein as simulation objects. A simulation object may simulate any desired thing in a simulation, such as a tank, a helicopter, a pressure gauge, or the like.

Figure 2:
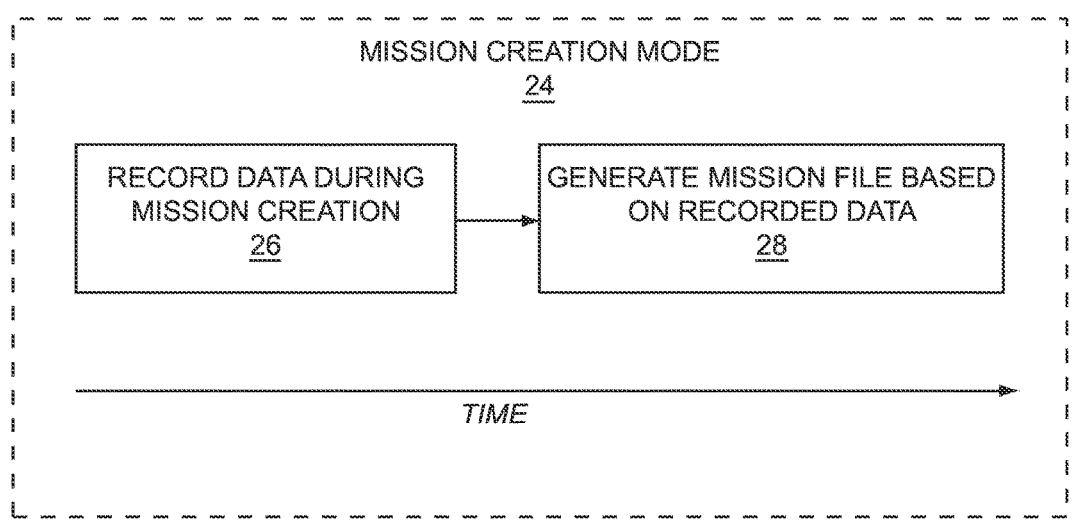
FIG. 2 is a high-level block diagram of a mission creation mode according to one embodiment.

In one embodiment, the simulation platform module 18 provides a mission creation mode, wherein an individual can define a mission that can be utilized for subsequent training purposes. A mission comprises a series of identified inputs and corresponding simulation object behaviors. FIG. 2 is a high-level block diagram of a mission creation mode 24 according to one embodiment. Broadly, the mission creation mode 24 involves recording data during the creation of the mission. Specifically, the mission creation mode 24 involves recording inputs of a user (such as a trainer) as well as recording data, such as object attributes that identify the behavior of the simulation objects during the mission (block 26). After the mission is complete, the simulation platform module 18 generates a mission file based on the recorded data (block 28). The mission file identifies a simulation sequence based on the recorded data, and identifies a deviating user action based on the simulation sequence. The mission file also includes an exception handler module configured to be triggered upon an occurrence of the deviating user action. The mission file may be used in a subsequent mission training mode to train users, in part by comparing their performance with that of the simulation sequence identified in the mission file.

Figure 3:
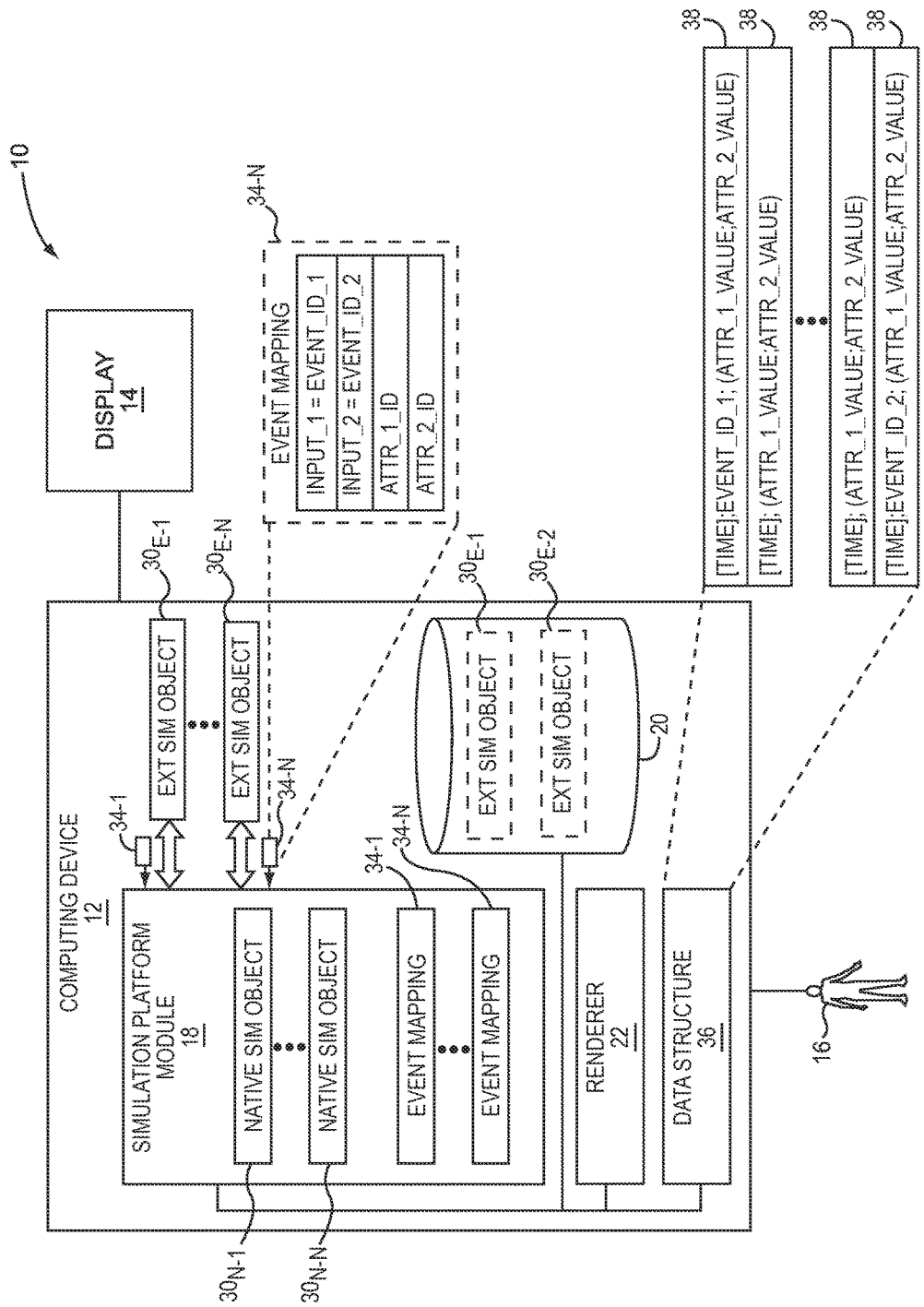
FIG. 3 is a block diagram of the system illustrated in FIG. 1 in greater detail during the mission creation mode according to one embodiment.

FIG. 3 is a block diagram of the system 10 illustrated in FIG. 1 in greater detail during the mission creation mode 24 according to one embodiment. The simulation platform module 18 includes one or more native simulation objects $30_{N\text{-}1}$-$30_{N\text{-}N}$ (generally, native simulation objects $30_N$). The native simulation objects $30_N$ form part of the codebase of the simulation platform module 18. The simulation platform module 18 may also communicate with a plurality of external simulation objects $30_{E\text{-}1}$-$30_{E\text{-}N}$ (generally, external simulation objects $30_E$). The external simulation objects $30_E$ are not part of the codebase of the simulation platform module 18, and may be generated or otherwise manufactured separately from the simulation platform module 18, but implement protocols that enable communication and integration between the external simulation objects $30_E$ and the simulation platform module 18. The native simulation objects $30_N$ and the external simulation objects $30_E$ may be referred to herein generally as simulation objects 30.

As an example of the use of an external simulation object $30_E$, assume that a trucking entity that offers trucking services has licensed or purchased the simulation platform module 18. The trucking entity may be in the process of purchasing a new model of truck for use in providing trucking services, and may desire that its drivers be trained on the new model of truck. Thus, the trucking entity may desire that a simulation be generated that simulates the new model of truck. The manufacturer of the simulation platform module 18 may not be willing to manufacture a native simulation object that simulates the new model of the truck, or may not be able to manufacture a native simulation object that simulates the new model of the truck within a suitable timeframe. The trucking entity may, alternatively, develop an external simulation object $30_E$ that simulates the operation of the new model of truck, and such external simulation object $30_E$ may be, as will be discussed in greater detail herein, integrated into a simulation during operation of the simulation platform module 18.

Figure 4:
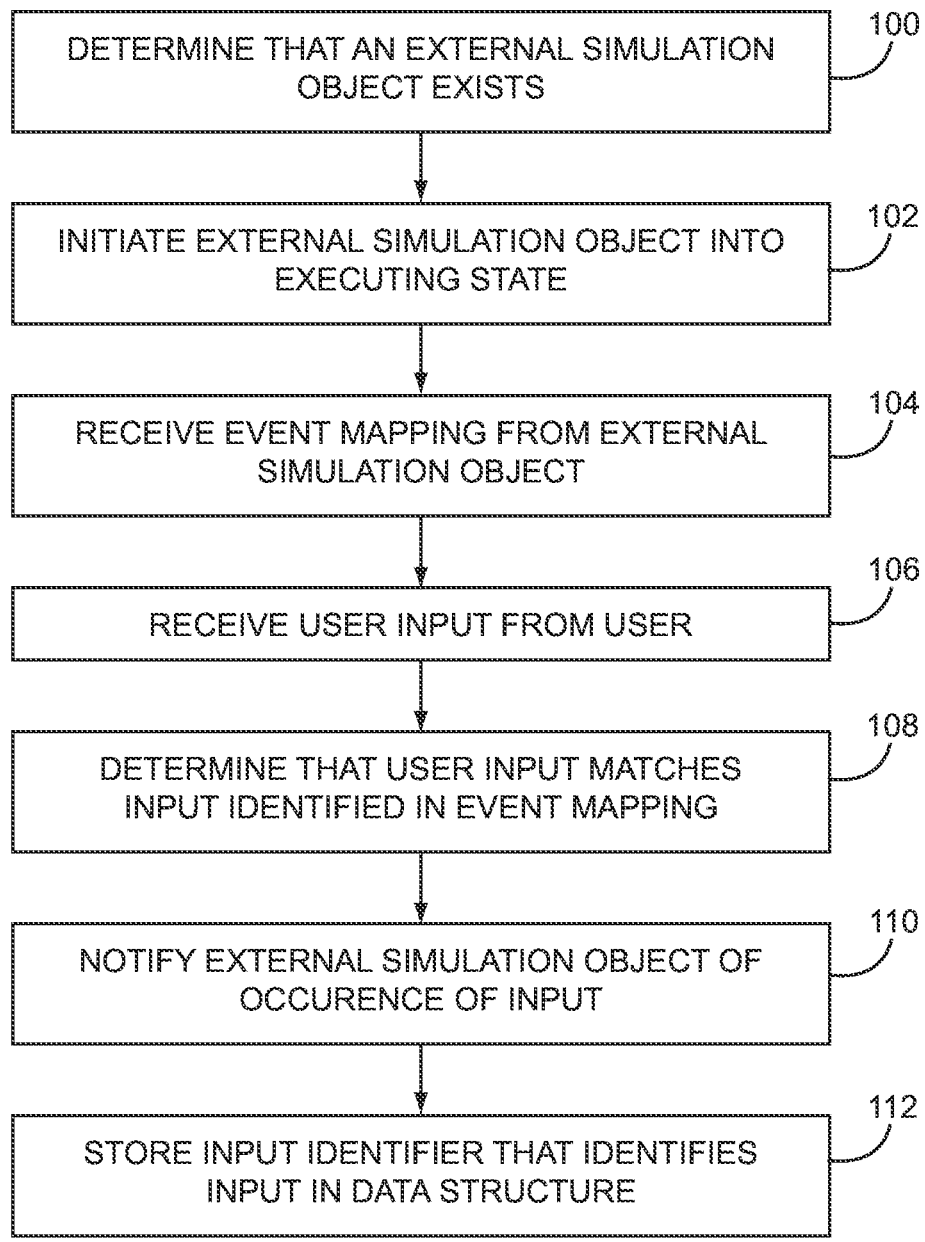
FIG. 4 is a flowchart of a method for recording data during the mission creation mode according to one embodiment.

FIG. 4 is a flowchart of a method for recording data during the mission creation mode 24, as discussed briefly above with respect to block 26 of FIG. 2, according to one embodiment. FIG. 4 will be discussed in conjunction with FIG. 3. In one embodiment, during an initialization stage, the simulation platform module 18 determines that an external simulation object $30_E$ exists (FIG. 4, block 100). For example, the user 16 may, using an input device such as a mouse or other peripheral, initiate the simulation platform module 18. The simulation platform module 18 is aware of the native simulation objects $30_N$, because the native simulation objects $30_N$ are part of the codebase of the simulation platform module 18, but is not aware of the external simulation objects $30_E$, because the external simulation objects $30_E$ are not part of the codebase of the simulation platform module 18.

The mechanism by which the simulation platform module 18 determines the existence of the external simulation objects $30_E$ may differ depending on a particular embodiment. In one embodiment, an entity that wishes to use an external simulation object $30_E$ may copy the file, or files, that make up the external simulation object $30_E$ to a predetermined location, such as a predetermined folder, on the storage 20. The simulation platform module 18, as part of an initialization stage, may search the predetermined location to determine if any external simulation objects $30_E$ exist.

The simulation platform module 18 then initiates the external simulation objects $30_E$ that are determined to exist (FIG. 4, block 102). The initiation process may depend on the particular operating system used on the computing device 12, or on the programming language utilized to generate the external simulation objects $30_E$. In an object-oriented embodiment, the initiation process may involve instantiating the external simulation object $30_E$, such that memory in the computing device 12 is allocated to the external simulation objects $30_E$.

As the external simulation objects $30_E$ initiate, each external simulation object $30_E$ may initiate a communication with the simulation platform module 18, or the simulation platform module 18 may initiate a communication with the external simulation object $30_E$, such that one or more event mappings 34 are communicated from a respective external simulation object $30_E$ to the simulation platform module 18 (FIG. 4, block 104). Each event mapping 34 contains information that maps an input to a corresponding event implemented by the respective external simulation object $30_E$ in response to notification of the occurrence of the input. An input is data that indicates a peripheral has been manipulated in a way that the computing device 12 is aware of the manipulation. The particular data can differ depending on the peripheral. For example, if the peripheral is a keyboard, the input can comprise an alphanumeric key struck by the user 16. If the peripheral is a game controller, the input can identify the particular manipulation of the game controller. If the peripheral is a steering wheel, the input may identify the rate, direction and amount of rotation of the steering wheel used by the user 16. If the peripheral is a series of pedals in a vehicle, the input may identify the pedal pressed by the user 16, the speed at which it was pressed, and the distance the pedal traveled, for example. The event mapping 34 may identify the event to which the input is mapped via an event identifier (ID).

As an example, the event mapping 34-N maps two inputs to corresponding events identified via event IDs. In particular, the event mapping 34-N maps an input designated as "INPUT_1" to an event ID designated as "EVENT_ID_1", and an input designated as "INPUT_2" to an event ID designated as "EVENT_ID_2." Thus, when notified by the simulation platform module 18 that the event identified by EVENT_ID_1 has occurred, the external simulation object $30_{E-N}$ implements the corresponding event. The corresponding event may comprise any simulation action that can be implemented in a simulation, and could comprise, for example, altering flaps in an airplane simulated in the simulation, altering a speed of a vehicle simulated in the simulation, altering a direction of a vehicle simulated in the simulation, or any other desired event. The inputs INPUT_1 and INPUT_2 may comprise any user input, as discussed above. While for purposes of illustration only two inputs are mapped, the embodiments are not limited to any number of inputs, and an event mapping 34 may map tens or hundreds of inputs to different events.

The event mapping 34-N also identifies two object attribute IDs, each of which identifies a corresponding object attribute of the corresponding external simulation object $30_{E-N}$. The object attribute IDs can be used to determine object attribute values of the object attributes of the external simulation object $30_{E-N}$. The object attributes may comprise any attribute that an external simulation object $30_E$ may have, including, for example, a velocity, a location, a pressure, a temperature of the external simulation object 30, and the like. Again, while only two object attribute IDs are illustrated for purposes of illustration, an event mapping 34 may comprise tens or hundreds of different object attribute IDs. The simulation platform module 18 receives the event mappings 34 and stores them in a memory for subsequent use, as discussed herein.

After the initialization stage of the simulation platform module 18, the simulation platform module 18 has initiated each external simulation object $30_E$ that the simulation platform module 18 has determined exists, and received corresponding event mappings 34 from such external simulation objects $30_E$. The user 16, in the role of a trainer in this example, may begin entering user inputs to define a particular mission. An iteration of steps may then begin. For each user input entered by the user 16, the simulation platform module 18 receives the respective user input (FIG. 4, block 106). The simulation platform module 18 than compares the user input to the event mappings 34 to determine whether the user input matches an input identified in an event mapping 34. Assume that the simulation platform module 18 determines that the user input matches an input identified in an event mapping 34 (FIG. 4, block 108). For purposes of illustration, assume that the user input entered by the user 16 matches the input INPUT_1 identified in the event mapping 34-N. The simulation platform module 18 notifies the corresponding external simulation object $30_{E-N}$ of the occurrence of the input (FIG. 4, block 110). In one embodiment, the simulation platform module 18 notifies the corresponding external simulation object $30_{E-N}$ of the occurrence of the input by communicating the corresponding event ID (EVENT_ID_1) to the external simulation object $30_{E-N}$. The simulation platform module 18 stores the event ID (EVENT_ID_1) in a data structure 36 (FIG. 4, block 112). The simulation platform module 18 may also concurrently therewith store additional information in the data structure 36, such as the time that the user input was entered, either in absolute time or relative to a reference time, and the simulation platform module 18 may also determine attribute values of the object attributes of the external simulation object $30_{E-N}$, and/or attribute values of the object attributes of other external simulation objects $30_E$. Such information may be stored in one or more entries 38 of the data structure 36. This process may be repeated iteratively during the creation of the mission by the user 16.

Figure 5:
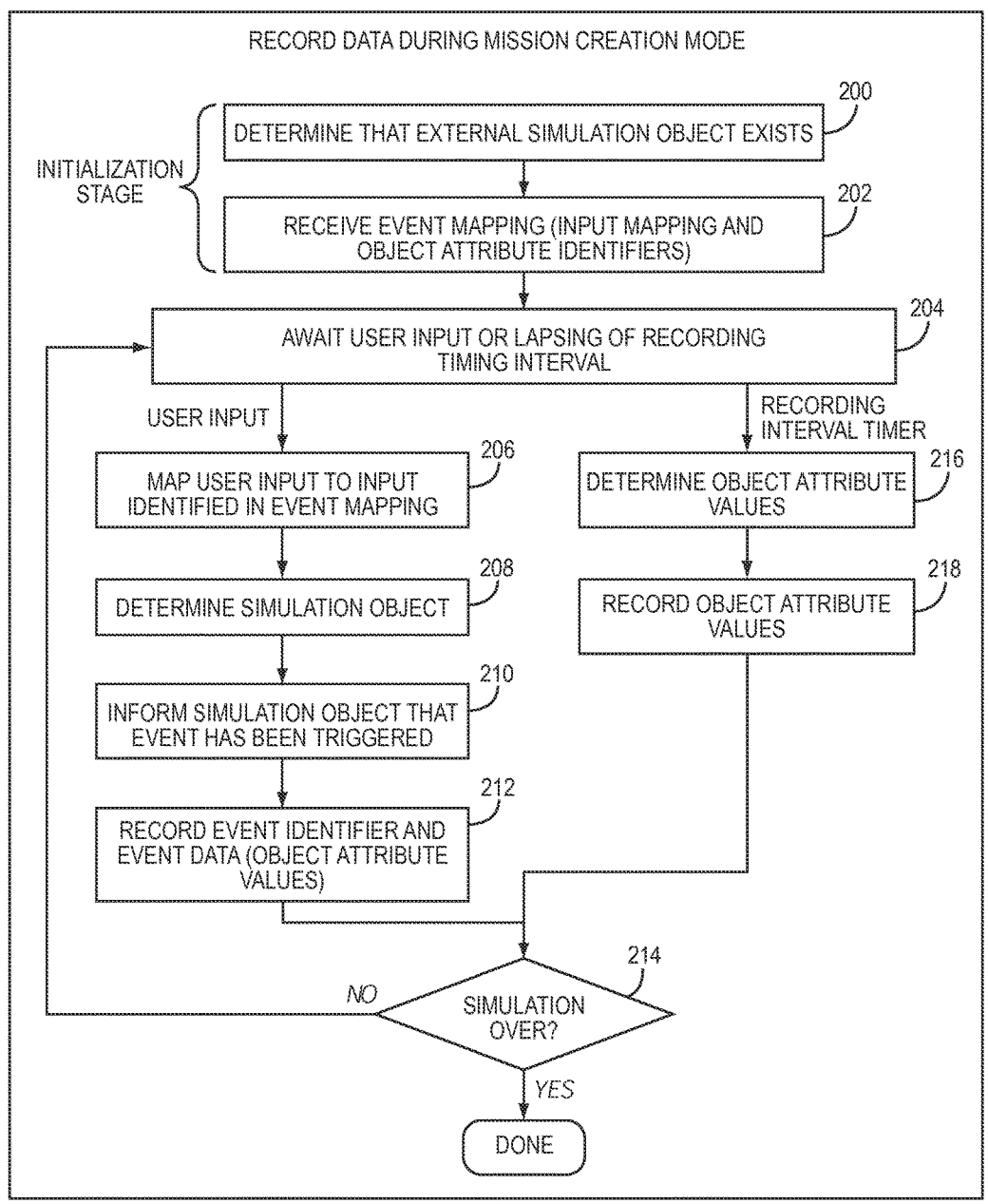
FIG. 5 is a flowchart of a method for recording data during the mission creation mode according to another embodiment.

FIG. 5 is a flowchart of a method for recording data during the mission creation mode according to another embodiment. FIG. 5 will be discussed in conjunction with FIG. 3. Similar to the event mappings 34 associated with external simulation objects $30_E$, the simulation platform module 18 maintains event mappings that map a user input to a particular input associated with a native simulation object $30_N$, and the simulation platform module 18 is also aware of the object attributes of the native simulation objects $30_N$ by virtue of the native simulation objects $30_N$ sharing the same codebase as the simulation platform module 18. During the initialization stage of the simulation platform module 18, the simulation platform module 18 determines the existence of one or more external simulation objects $30_E$ (FIG. 5, block 200). The simulation platform module 18 receives event mappings from the external simulation objects $30_E$ that contain information that maps an input to a corresponding event implemented by the respective external simulation object $30_E$ in response to notification of the occurrence of the input, and one or more object attribute IDs, each of which identifies a corresponding object attribute of the corresponding external simulation object $30_E$ (FIG. 5, block 202). The simulation platform module 18 may then enter a wait state, wherein the simulation platform module 18 is awaiting the occurrence of any of several different events (FIG. 5, block 204).

One possible event is the receipt of user input from the user 16. In this situation, the simulation platform module 18 may map the received user input to an input identified in an event mapping 34 (FIG. 5, block 206). The event mapping 34 may be associated with an external simulation object $30_E$ or with a native simulation object $30_N$. Based on the event mapping 34 to which the user input was mapped, the simulation platform module 18 determines the corresponding simulation object 30 (FIG. 5, block 208). The simulation platform module 18 informs the corresponding simulation object 30 that the event to which the input is mapped has been triggered (FIG. 5, block 210). The simulation platform module 18 records the event input ID that corresponds to the user input in the data structure 36, as well as any additional desirable information, such as the time of entry of the user input, and the object attribute values of the object attributes associated with the simulation object 30 and/or any other simulation objects 30 that are involved in the simulation (FIG. 5, block 212). If the simulation has not ended, the simulation platform module 18 may return to block 204 and await a next event (FIG. 5, blocks 214, 204).

In one embodiment, the simulation platform module 18 may periodically obtain and record in the data structure 36 the object attribute values of object attributes of each external simulation object $30_E$ that is involved in the simulation. The duration of the period may be defined by a recording timing interval set by the simulation platform module 18. The duration may be any desired interval, such as $\frac{1}{100}^{th}$ of a second, $\frac{1}{10}^{th}$ of a second, or every second, for example. Thus, another possible event at block 204 is the lapsing of the recording timing interval. Upon this event, the simulation platform module 18 may query each simulation object 30 involved in the simulation to obtain object attribute values of object attributes of such simulation objects 30 (FIG. 5, block 216). The simulation platform module 18 may also record the object attribute values in the data structure 36 (FIG. 5, block 218). The simulation platform module 18 may then return to a wait state at block 204 if the simulation is not complete (FIG. 5, block 214).

The particular user inputs and object attribute values that are recorded by the simulation platform module 18 may, in some embodiments, be user selectable. Thus, in one embodiment, the trainer may be presented with a user interface that allows the trainer to select which object attributes of the simulation objects 30 are to be recorded, and which user inputs are to be recorded. The selected object attributes may be the basis for identifying continuous events, as described in greater detail below, that are subsequently identified by the simulation platform module 18, and the selected user inputs may be the basis for identifying discrete events by the simulation platform module 18.

These series of steps may be repeated for the duration of the mission creation mode. At the completion of the mission creation mode, the data structure 36 may comprise a relatively large number of entries 38 that collectively identify information associated with the generation of the mission, including each user input entered by the user 16, as well as the object attribute values of object attributes of the simulation objects 30, including both native simulation objects $30_N$ and external simulation objects $30_E$. This information can effectively identify the state of each simulation object 30 at any given point in time during the mission, as well as what user inputs were entered at given points in time, and even the causal relationships between the entry of a user input by the user 16 and the corresponding change in object attribute values of object attributes of simulation objects 30 over a period of time.

For example, at a time T1, the user 16 could enter a user input that mapped to an event associated with increasing the lift of an aircraft that is simulated by an external simulation object $30_E$, such as an increase in thrust, or movement of a flap. Even if no additional user input is received for a particular duration of time, during such duration of time, the simulation platform module 18 may continually obtain the object attribute values of the external simulation object $30_E$ that identify the current altitude and airspeed of the simulated aircraft, and record such information in the data structure 36. Such information thus identifies behavior of the simulated aircraft in terms of both user inputs, as well as the effects such inputs have on the external simulation object $30_E$ in the simulation.

Figure 6:
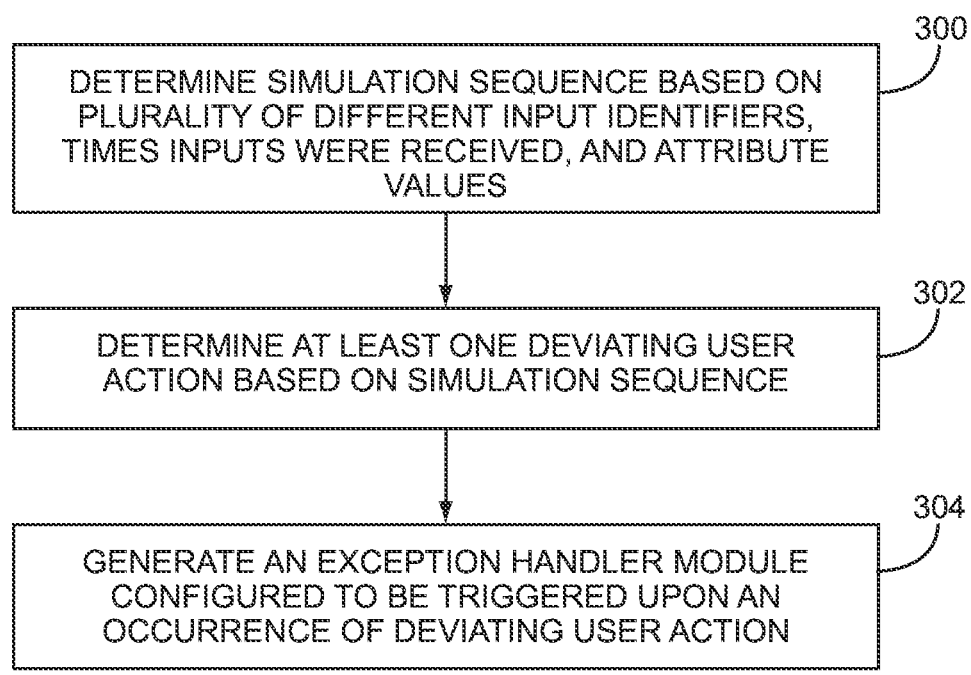
FIG. 6 is a high-level flowchart of a method for generating a mission file according to one embodiment.

As discussed above with regard to FIG. 2, the mission creation mode 24 also involves the generation of a mission file based on the data recorded during the creation of the mission (FIG. 2, block 28). FIG. 6 is a high-level flowchart of a method for generating a mission file according to one embodiment. The simulation platform module 18 accesses the contents of the data structure 36. In some embodiments, after the mission has been created, the simulation platform module 18 may record the contents of the data structure 36 to a file on a storage, such as the storage 20, so that the contents can be used for the generation of a mission file at a future point in time. Alternatively, the simulation platform module 18 may access the data structure 36 in the memory of the computing device 12.

The simulation platform module 18 determines and stores in a mission file a simulation sequence based on the information contained in the data structure 36, including, for example, the input identifiers identified in the data structure 36, the times the user inputs were received from the user 16, the object attribute values of the object attributes identified in the data structure 36 and the times such object attribute values were determined, and the like (block 300). The simulation platform module 18, based on the simulation sequence, identifies one or more deviating conditions (block 302). A deviating condition is a condition that deviates in some identified manner from the simulation sequence. For example, a deviating condition may comprise the receipt of a user input that differs from an expected user input, or a failure to receive a user input within an expected period of time. A deviating condition may also be based on object attribute values, and may comprise, for example, a failure to obtain a particular altitude within a predetermined time frame, or may comprise a failure to manipulate a simulation object 30 to a particular location within a predetermined time frame. These are merely examples, and it should be apparent that a deviating condition can be based on any desired deviation from the simulation sequence.

For each deviating condition identified, the simulation platform module 18 generates an exception handler module that is configured to be triggered upon an occurrence of the deviating user action (block 304). The exception handler module may provide information, such as an alert, to the user 16 that the user 16 has deviated from the expected condition. The exception handler modules are stored in the mission file.

Figure 7:
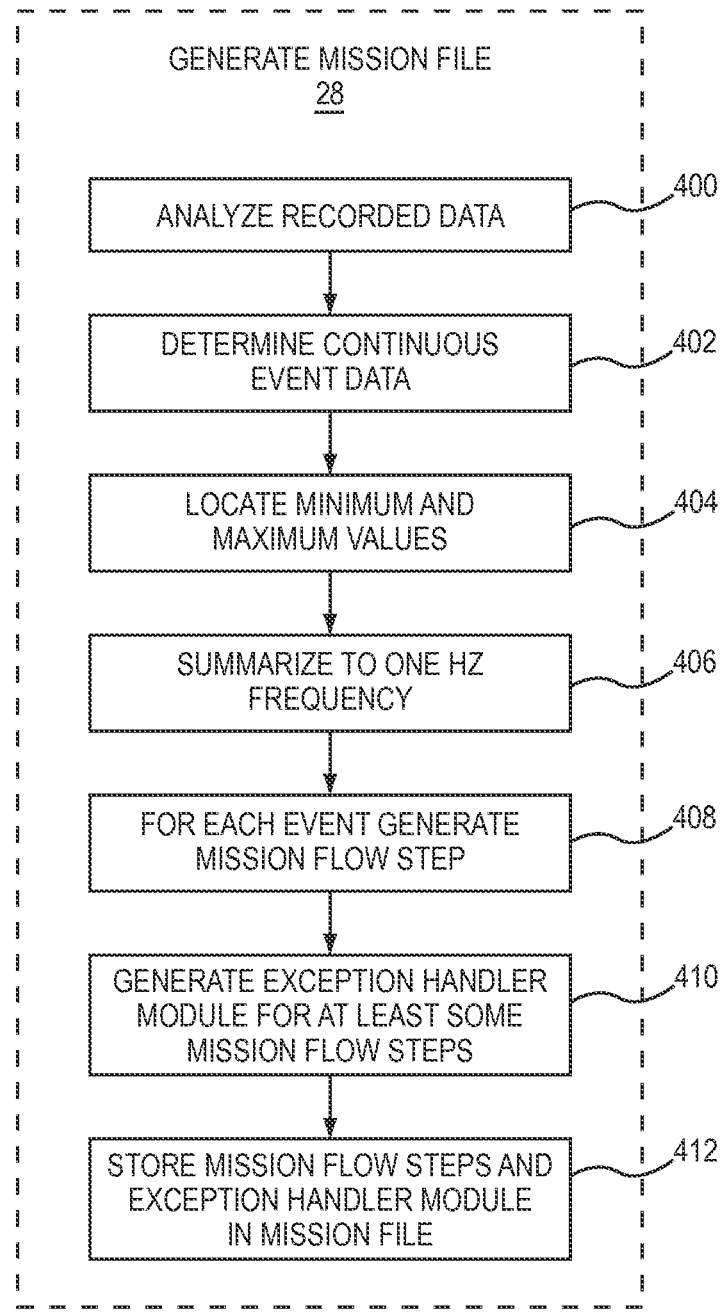
FIG. 7 is a flowchart of a method for generating a mission file according to another embodiment.

FIG. 7 is a flowchart of a method for generating a mission file according to another embodiment. The simulation platform module 18 analyzes the data recorded in the data structure 36 (block 400). In one embodiment, the simulation platform module 18 identifies and distinguishes continuous events from discrete events (block 402). A discrete event relates to a simulation condition that has a discrete number of values, such as the setting of a switch. A discrete event, for example, may correspond to a user input. A continuous event is a simulation event that occurs over a period of time and may have a varying number of values. Continuous events may be identified based on object attributes and object attribute values. A continuous event, for example, may be the location and altitude of a simulated airplane over a period of time, and thus, the attribute values associated with this continuous event may differ each time attribute values are determined. The determination of a continuous event may involve analyzing the object attribute values to determine minima and/or maxima, as well as changes in the object attribute values over time. Thus, a series of object attribute values that indicate that a plane was flown from an altitude of 1000 feet to an altitude of 6000 feet in 80 seconds may result in the identification of one continuous event. As discussed above, the particular user inputs and object attribute values that are recorded by the simulation platform module 18 may be user selectable in some embodiments.

For each continuous event, the simulation platform module 18 may process the event data, such as attribute values, for example, to determine the minimums and maximums of values over time, and to smooth the data to eliminate noisy data and ensure a consistent rate, such as a 1 Hz rate, or any other desirable rate (blocks 404-406). This process may reduce the overall amount of data in the mission file compared to the data structure 36, yet maintain the relevant event information to accurately identify the mission.

For each discrete and continuous event that is identified, a mission flow step is generated (block 408). For each such mission flow step, the simulation platform 18 generates an exception handler module that is configured to be triggered upon an occurrence of the deviating user action (block 410). In some embodiments, the exception handler modules are configured to alert the user 16 to a deviation from the simulation sequence. At the end of the mission file generation process, a mission file is generated that includes a plurality of mission flow steps identifying a simulation sequence, along with one or more exception handler modules configured to be triggered upon an occurrence of a corresponding deviating user action (block 412). The mission file may comprise any suitable format, such as an XML format, that is suitable for the simulation platform module 18 to load during the mission training mode. A trainer may access the mission file, and revise any desired aspect of the mission file, including, for example, the generated exception handler module. For example, the trainer may provide a specific message that will be displayed upon execution of the exception handler module. By way of non-limiting examples, identified events, and corresponding mission flow steps, could be based on an increase in throttle to 100 percent, an increase in speed by 60 knots, taking off and reaching 1000 feet in altitude within one minute, and/or raising the landing gear.

Figure 8:
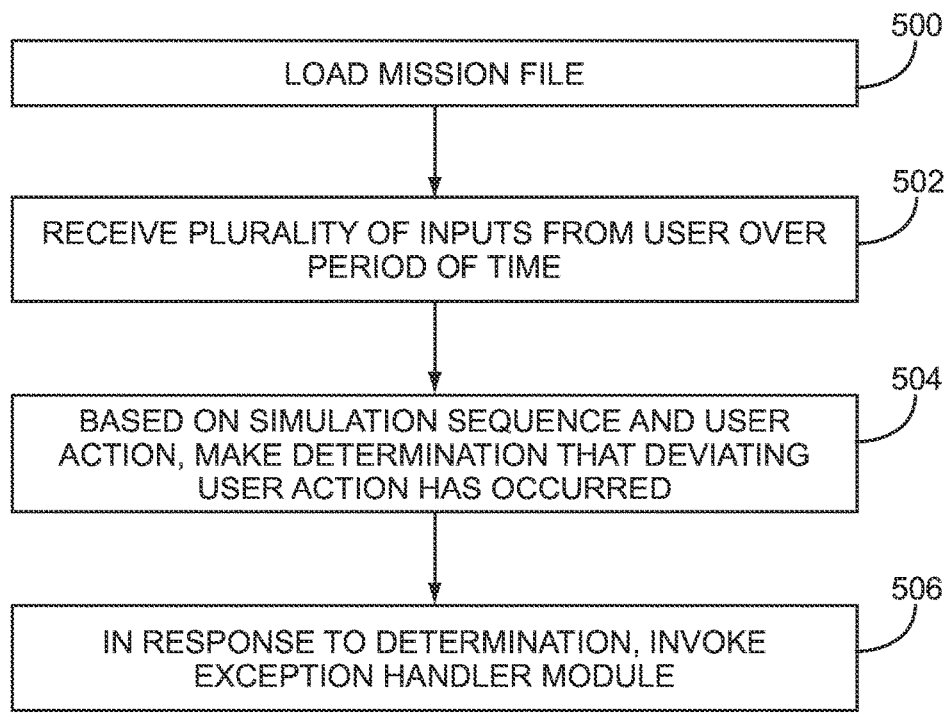
FIG. 8 is flowchart of a method for implementing a mission training mode according to one embodiment.

FIG. 8 is flowchart of a method for implementing a mission training mode according to one embodiment. The mission training mode is used to train a user, such as a trainee, based on a previously generated mission identified in a mission file. The simulation platform module 18 loads the desired mission file (block 500). Over a period of time, the simulation platform module 18 receives a plurality of inputs from a user (block 502). Based on the simulation sequence identified in the mission file, the simulation platform module 18 determines that a deviating user action has occurred (block 504). For example, the simulation platform module 18 may determine, based on the simulation sequence identified in the mission file, that the user has failed to maneuver an external simulation object $30_E$ to an appropriate location within a particular timeframe, or has failed to provide a particular user input within a particular timeframe, or the like. In response to the determination, the simulation platform module 18 invokes the exception handler module that corresponds to the deviating user action (block 506). The exception handler module may alert the user to the deviating user action. For example, the exception handler module may display text alerting the user to the deviating user action, may display an image or icon providing the user with a hint or clue as to a correct action, or the like.

Figure 9:
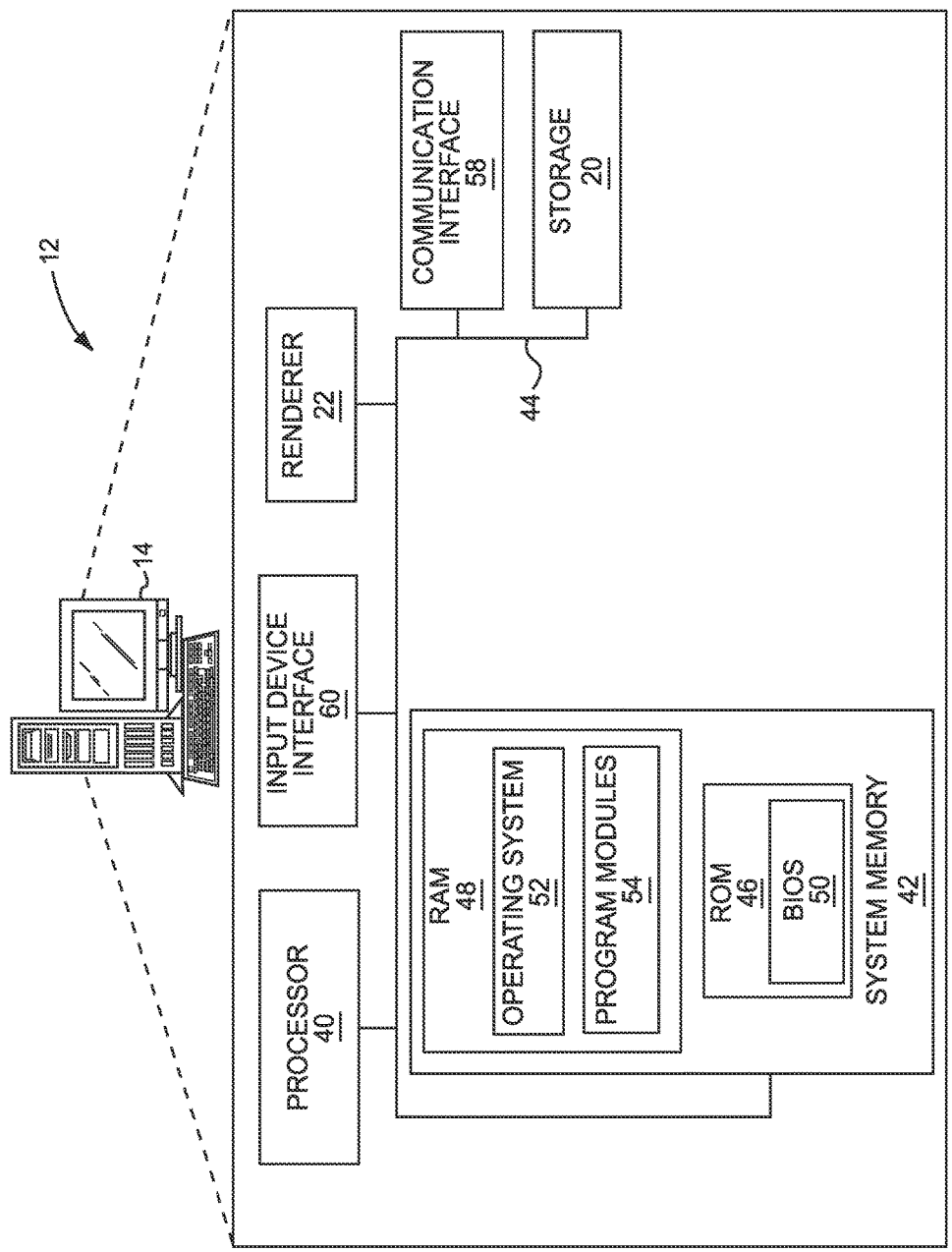
FIG. 9 is a block diagram of a computing device according to one embodiment.

FIG. 9 is a block diagram of a computing device 12 according to one embodiment. The computing device 12 may comprise any computing or processing device capable of executing software instructions and/or containing circuitry for implementing the functionality described herein. The computing device 12 includes a processor 40, a memory 42, and a system bus 44. The system bus 44 provides an interface for system components including, but not limited to, the memory 42 and the processor 40. The processor 40 can be any commercially available or proprietary processor. Dual micro-processors and other multi-processor architectures may also be employed as the processor 40.

The system bus 44 may be any of several types of bus structures that may further interconnect to a memory bus (with or without a memory controller), a peripheral bus, and/or a local bus using any of a variety of commercially available bus architectures. The memory 42 may include non-volatile memory 46 (e.g., read only memory (ROM), erasable programmable read only memory (EPROM), electrically erasable programmable read only memory (EEPROM), etc.) and/or volatile memory 48 (e.g., random access memory (RAM)). A basic input/output system (BIOS) 50 may be stored in the non-volatile memory 46, and can include the basic routines that help to transfer information between elements within the computing device 12. The volatile memory 48 may also include a high-speed RAM, such as static RAM for caching data.

The computing device 12 may further include the computer-readable storage 20, which may comprise, for example, an internal, external, or network-attached hard disk drive (HDD) (e.g., enhanced integrated drive electronics (EIDE) or serial advanced technology attachment (SATA)), or the like. The computer-readable storage 20 and other drives, associated with computer-readable and computer-usable media, provide non-volatile storage of data, data structures, computer-executable instructions, and the like. Although the description of computer-readable media above refers to an HDD, it should be appreciated by those skilled in the art that other types of media which are readable by a computer, such as Zip disks, magnetic cassettes, flash memory cards, cartridges, and the like, may also be used in the operating environment, and further, that any such media may contain computer-executable instructions for performing novel methods of the disclosed simulation platform module 18.

A number of modules can be stored in the computer-readable storage 20 and in the volatile memory 48, including an operating system 52 and one or more program modules 54, which may implement the functionality described herein in whole or in part, including, for example, the simulation platform module 18, and other processing and functionality described herein. It is to be appreciated that the embodiments can be implemented with various commercially available operating systems 52 or combinations of operating systems 52.

All or a portion of the embodiments may be implemented as a computer program product stored on a transitory or non-transitory computer-usable or computer-readable storage medium, such as the computer-readable storage 20, which includes complex programming instructions, such as complex computer-readable program code, configured to cause the processor 40 to carry out the steps described herein. Thus, the computer-readable program code can comprise software instructions for implementing the functionality of the embodiments described herein when executed on the processor 40. The processor 40, in conjunction with the program modules 54 in the volatile memory 48, may serve as a control system for the computing device 12 that is configured to, or adapted to, implement the functionality described herein. The computing device 12 may also include a communication interface 58 for communicating with a network. The computing device 12 may also include the display 14 that provides information to an operator or user. The renderer 22 generates imagery for presentation on the display 14. An input device interface 60 is configured to communicate with one or more input devices, such as a keyboard, a joystick, or any other suitable simulator input devices.

Those skilled in the art will recognize improvements and modifications to the preferred embodiments of the present disclosure. All such improvements and modifications are considered within the scope of the concepts disclosed herein and the claims that follow.

What is claimed is:

1. A method for generating a mission file, comprising:
   determining, by a simulation platform module executing on a computing device comprising a processor, that an external simulation object exists;
   initiating the external simulation object into an executing state;
   receiving from the external simulation object:
      a first event mapping that maps a first input to a first event implemented by the external simulation object in response to a notification of an occurrence of the first input wherein the first input comprises data that indicates that at least one peripheral device associated with the computing device has been manipulated; and an object attribute identifier that identifies an object attribute controlled by the external simulation object;

receiving a first user input from a user via a peripheral device associated with the computing device;

determining that the first user input matches the first input;

notifying the external simulation object of the occurrence of the first input; and storing a first input identifier that identifies the first input in a data structure.

2. The method of claim 1, further comprising:
determining an attribute value of the object attribute; and
storing the attribute value in the data structure.

3. The method of claim 2, wherein a plurality of object attribute identifiers are received from the external simulation object, each object attribute identifier identifying a corresponding object attribute of a plurality of object attributes, and further comprising determining attribute values of the plurality of object attributes, and storing the attribute values in the data structure.

4. The method of claim 1, wherein the external simulation object has a different codebase from the simulation platform module.

5. The method of claim 1, further comprising:
receiving from each external simulation object of a plurality of external simulation objects:
   an event mapping that maps a respective input to a corresponding event implemented by the each external simulation object in response to a notification of an occurrence of the respective input, wherein the each respective input comprises data that indicates that at least one peripheral device associated with the computing device has been manipulated; and
   a corresponding object attribute identifier that identifies an object attribute controlled by the each external simulation object; and
receiving, over a period of time, a plurality of user inputs from the user via a peripheral device associated with the computing device, and for each user input:
   determining, based on an event mapping, that the each user input matches the respective input;
   communicating the occurrence of the respective input to the external simulation object associated with the respective input; and
   storing an input identifier that identifies the respective input in the data structure.

6. The method of claim 1, wherein determining that the external simulation object exists comprises:
searching a predetermined location on a storage; and
finding the external simulation object in the predetermined location, wherein the external simulation object was unknown to the simulation platform module prior to searching the predetermined location.

7. The method of claim 1, further comprising:
initiating an native simulation object that has a same codebase as the simulation platform module;
receiving a second event mapping that maps a second input to a second event implemented by the native simulation object in response to a notification of an occurrence of the second input, wherein the second input comprises data that indicates that at least one peripheral device associated with the computing device has been manipulated;

receiving a second user input from the user via a peripheral device associated with the computing device;
determining that the second user input matches the second input;
notifying the native simulation object of the occurrence of the second input; and
storing a second input identifier that identifies the second input in the data structure.

8. The method of claim 1, further comprising:
storing, in the data structure, over a period of time, a plurality of different input identifiers that identify corresponding inputs and the respective times the corresponding inputs were received;
determining, at each time of a plurality of different times over the period of time, attribute values of a plurality of object attributes; and
storing, in the data structure, the attribute values, and the respective times the attribute values were determined.

9. The method of claim 8, further comprising:
based on the data structure, generating a mission file that identifies a simulation sequence based on the plurality of different input identifiers, the respective times the corresponding inputs were received, and the attribute values;
determining at least one deviating user action based on the simulation sequence; and
generating, by the computing device, an exception handler module configured to be triggered upon an occurrence of the at least one deviating user action, the exception handler module configured to alert the user to a deviation from the simulation sequence.

10. The method of claim 9, further comprising:
during a subsequent mission training mode:
   loading the mission file;
   receiving a second plurality of inputs from a trainee over a second period of time;
   based on the simulation sequence identified in the mission file and based on a user action, making a determination that the deviating user action has occurred; and
   in response to the determination, invoking the exception handler module.

11. The method of claim 10, wherein the deviating user action is a failure to provide a user input within a predetermined timeframe.

12. The method of claim 10, wherein the user action is user input by the user that is different from an expected user input.

13. The method of claim 1, wherein the first event mapping maps a plurality of inputs to corresponding events implemented by the external simulation object, wherein the plurality of inputs comprises data that indicates that at least one peripheral device associated with the computing device has been manipulated, and further comprising:
receiving, over a period of time, a plurality of respective user inputs from the user via a peripheral device associated with the computing device, and for each respective user input:
   determining, based on the first event mapping, that the respective user input maps to the corresponding event;
   communicating the occurrence of the respective user input to the external simulation object; and
   storing an input identifier that identifies the respective user input in the data structure.

14. A computing device, comprising:
a memory; and
a processor configured to:
  determine, by a simulation platform module, that an external simulation object exists;
  initiate, by the simulation platform module, the external simulation object into an executing state;
  receive from the external simulation object:
    a first event mapping that maps a first input to a first event implemented by the external simulation object in response to a notification of the occurrence of the first input, wherein the first input comprises data that indicates that at least one peripheral device associated with the computing device has been manipulated; and
    an object attribute identifier that identifies an object attribute controlled by the external simulation object;
  receive a first user input from a user via a peripheral device associated with the computing device;
  determine that the first user input matches the first input;
  notify the external simulation object of the occurrence of the first input; and
  store a first input identifier that identifies the first input in a data structure.

15. The computing device of claim 14, wherein the processor is further configured to:
  determine, by the simulation platform module, an attribute value of the object attribute; and
  store the attribute value in the data structure.

16. The computing device of claim 15, wherein a plurality of object attribute identifiers are received from the external simulation object, each object attribute identifier identifying a corresponding object attribute of a plurality of object attributes, and wherein the processor is further configured to determine attribute values of the plurality of object attributes, and store the attribute values in the data structure.

17. The computing device of claim 14, wherein the external simulation object has a different codebase from the simulation platform module.

18. The computing device of claim 14, wherein the processor is further configured to:
  receive, via the simulation platform module, from each external simulation object of a plurality of external simulation objects:
    an event mapping that maps a respective input to a corresponding event implemented by the each external simulation object in response to a notification of an occurrence of the respective input, wherein the respective input comprises data that indicates that at least one peripheral device associated with the computing device has been manipulated; and
    a corresponding object attribute identifier that identifies an object attribute controlled by the each external simulation object; and
  receive, over a period of time, a plurality of user inputs from the user via a peripheral device associated with the computing device, and for each user input:
    determine, based on an event mapping, that the each user input matches a respective input;
    communicate the occurrence of the respective input to the external simulation object associated with the respective input; and
    store an input identifier that identifies the respective input in the data structure.

19. The computing device of claim 14, wherein to determine that the external simulation object exists the processor is further configured to:
  search a predetermined location on a storage; and
  find the external simulation object in the predetermined location, wherein the external simulation object was unknown to the simulation platform module prior to searching the predetermined location.

20. The computing device of claim 14, wherein the processor is further configured to:
  initiate an native simulation object that shares a codebase of the simulation platform module;
  receive a second event mapping that maps a second input to a second event implemented by the native simulation object in response to a notification of the occurrence of the second input, wherein the second input comprises data that indicates that at least one peripheral device associated with the computing device has been manipulated;
  receive a second user input from the user via a peripheral device associated with the computing device;
  determine that the second user input matches the second input;
  notify the native simulation object of the occurrence of the second input; and
  store a second input identifier that identifies the second input in the data structure.

21. The computing device of claim 14, wherein the processor is further configured to:
  store, in the data structure, over a period of time, a plurality of different input identifiers that identify corresponding inputs and the respective times the corresponding inputs were received;
  determine, at each time of a plurality of different times over the period of time, attribute values of a plurality of object attributes; and
  store, in the data structure, the attribute values, and the respective times the attribute values were determined.

22. The computing device of claim 21, wherein the processor is further configured to:
  based on the data structure, generate a mission file that identifies a simulation sequence based on the plurality of different input identifiers, the respective times the corresponding inputs were received, and the attribute values;
  determine at least one deviating user action based on the simulation sequence; and
  generate an exception handler module configured to be triggered upon an occurrence of the at least one deviating user action, the exception handler module configured to alert the user to a deviation from the simulation sequence.

23. The computing device of claim 22, wherein the processor is further configured to:
  during a subsequent mission training mode:
    load the mission file;
    receive a second plurality of inputs from a trainee over a second period of time;
    based on the simulation sequence identified in the mission file and based on a user action, make a determination that the deviating user action has occurred; and
    in response to the determination, invoke the exception handler module.

24. A computer program product for generating a mission file, the computer program product stored on a non-transitory computer-readable storage medium and including instructions configured to cause a processor to carry out the steps of:
- determining, by a simulation platform module, that an external simulation object exists;
- initiating the external simulation object into an executing state;
- receiving from the external simulation object:
  - a first event mapping that maps a first input to a first event implemented by the external simulation object in response to a notification of an occurrence of the first input, wherein the first input comprises data that indicates that a peripheral device associated with the computing device has been manipulated; and
  - an object attribute identifier that identifies an object attribute controlled by the external simulation object;
- receiving a first user input from a user via a peripheral device associated with the computing device;
- determining that the first user input matches the first input;
- notifying the external simulation object of the occurrence of the first input; and
- storing a first input identifier that identifies the first input in a data structure.

* * * * *